Jan. 15, 1957 — H. R. BOLLIN — 2,777,231
THREE DIMENSIONAL PICTURES
Filed March 4, 1953 — 4 Sheets-Sheet 1

Inventor:
By Herman R. Bollin
Warren P. Horton, Atty.

Jan. 15, 1957 H. R. BOLLIN 2,777,231
THREE DIMENSIONAL PICTURES
Filed March 4, 1953 4 Sheets-Sheet 2
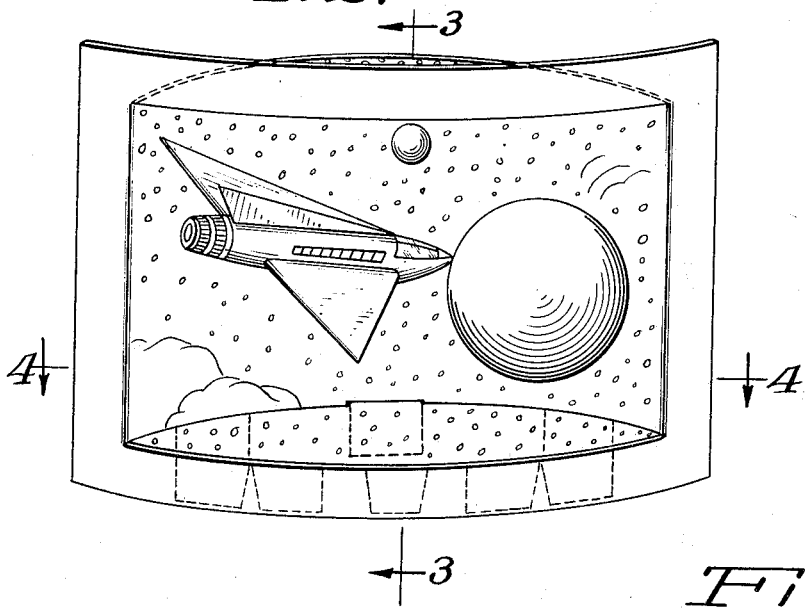
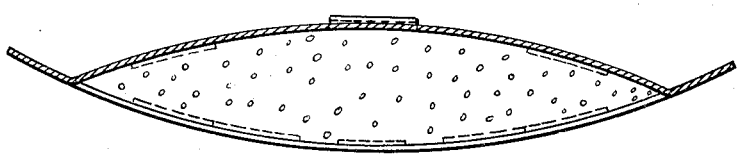
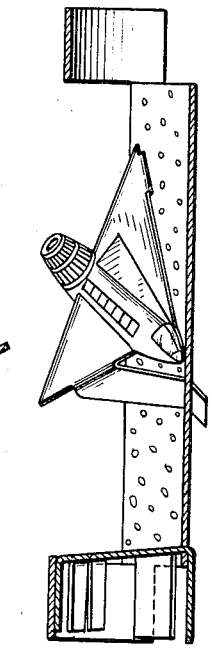
Inventor:
By Herman R. Bollin
Warren P. Horton
Atty.

Jan. 15, 1957
H. R. BOLLIN
2,777,231
THREE DIMENSIONAL PICTURES
Filed March 4, 1953
4 Sheets-Sheet 3
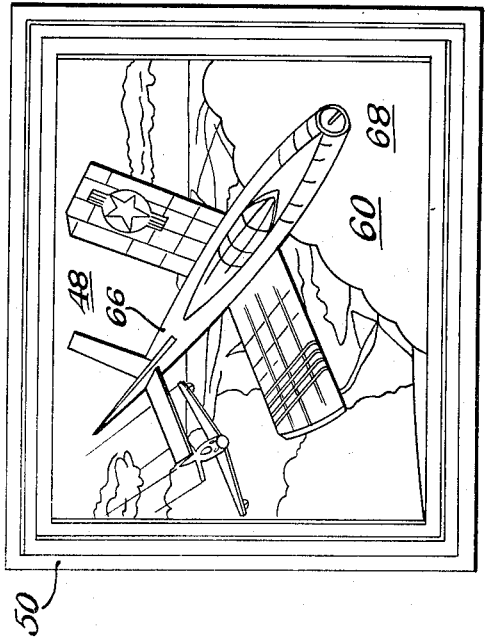
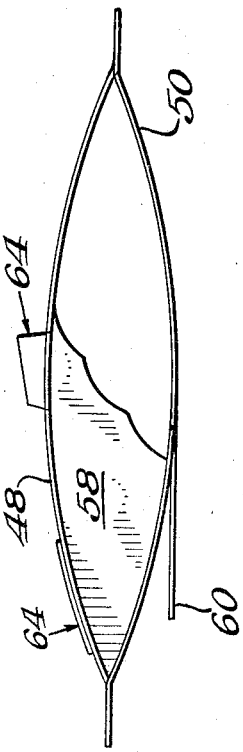
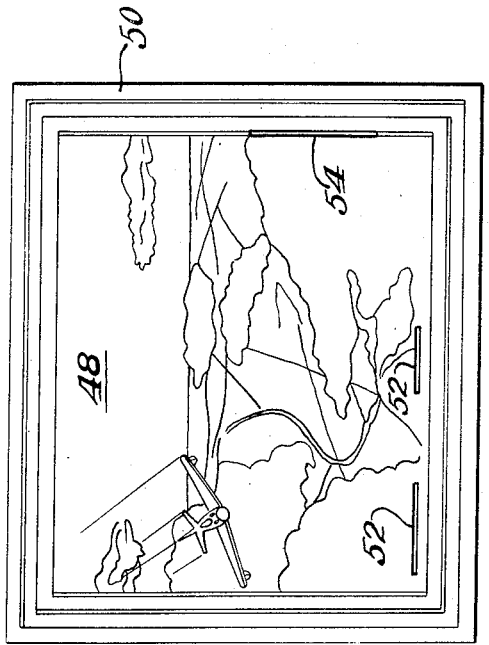
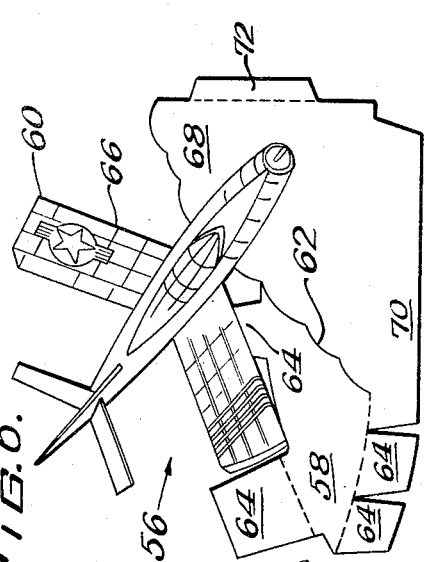
Inventor:
Herman R. Bollin
By Warren J. Horton
Atty.

Jan. 15, 1957　　　　　　H. R. BOLLIN　　　　　　2,777,231
THREE DIMENSIONAL PICTURES
Filed March 4, 1953　　　　　　　　　　　　　　4 Sheets-Sheet 4
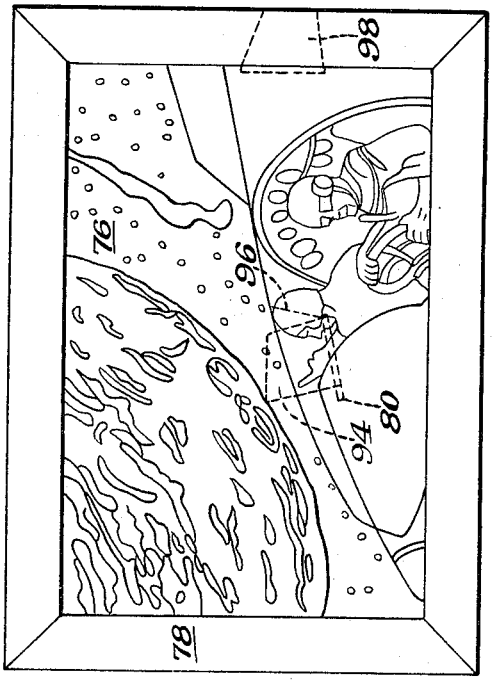
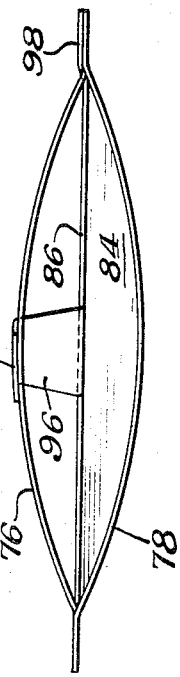
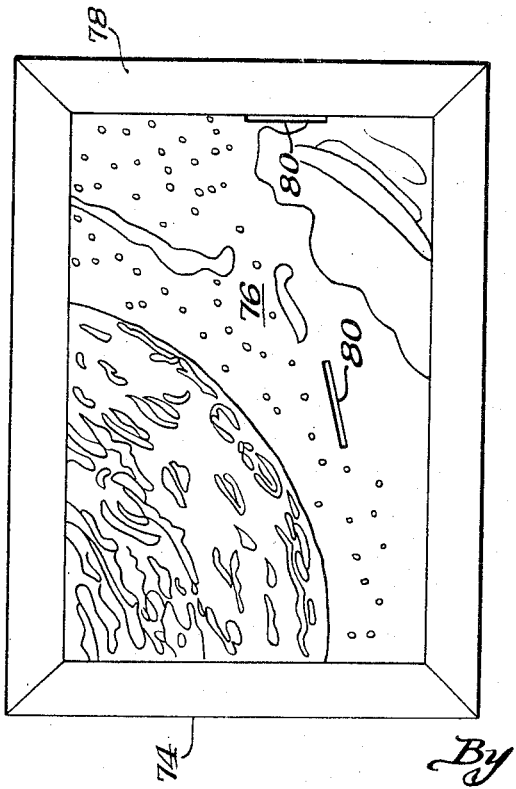
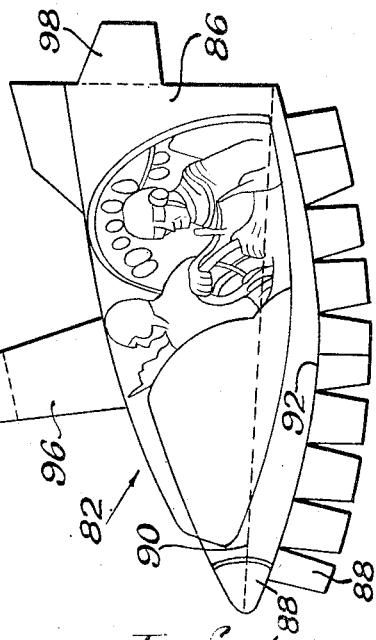
Inventor:
Herman R. Bollin
By
Atty.

United States Patent Office 2,777,231
Patented Jan. 15, 1957

2,777,231

THREE DIMENSIONAL PICTURES

Herman R. Bollin, Chicago, Ill.

Application March 4, 1953, Serial No. 340,365

7 Claims. (Cl. 40—126)

My invention relates to a three dimensional picture and more particularly, to a kit for constructing such a picture, the components of which are suitable to being laid out or printed on a single sheet of relatively stiff paper.

Printing cutouts, games, dolls and the like on one side of a breakfast food box has been known for decades as a highly successful selling technique. The popularity of such cutouts, etc. with children is a very important factor in the sales of a breakfast cereal, and a principal object of my invention is to provide a cereal, or more generally, food box cutout pattern which constitutes in itself a kit for the construction of a very simple, successful and effective three dimensional picture provided with its own frame. A novel pattern of this kind, however, is not limited to this specific use. In addition to placement on a wide variety of cartons, it may be inserted in packages as an enclosed premium, and indeed may be the subject of separate sale itself. More generally, therefore, this object may be stated to be to provide a three dimensional picture, the components of which may be printed on one side only of a single sheet of relatively stiff paper to be easily cut out, or previously die-cut to be pressed out, and assembled in a novel fashion, which is highly attractive in appearance.

Other objects and advantages of my invention will be apparent from the following description and drawings of which:

Fig. 2 is a perspective of the face of the completed picture;

Fig. 3 is a section which may be considered as being taken substantially along the line 3—3 of Fig. 2 looking in the direction of the arrows;

Fig. 4 is a section which may be considered as being taken substantially along the line 4—4 of Fig. 2 looking in the direction of the arrows;

Fig. 5 is an elevation of the picture sheet of a modified form of my invention;

Fig. 6 is an elevation of the insert to be attached thereto;

Fig. 7 is an elevation of the completed picture;

Fig. 8 is a top plan view of Fig. 7;

Fig. 9 is an elevation of the picture sheet for another exemplification of my invention;

Fig. 10 is an elevation of the insert therefor;

Fig. 11 is an elevation of the completed picture; and

Fig. 12 is a top plan view of the picture of Fig. 11.

Figure 1:
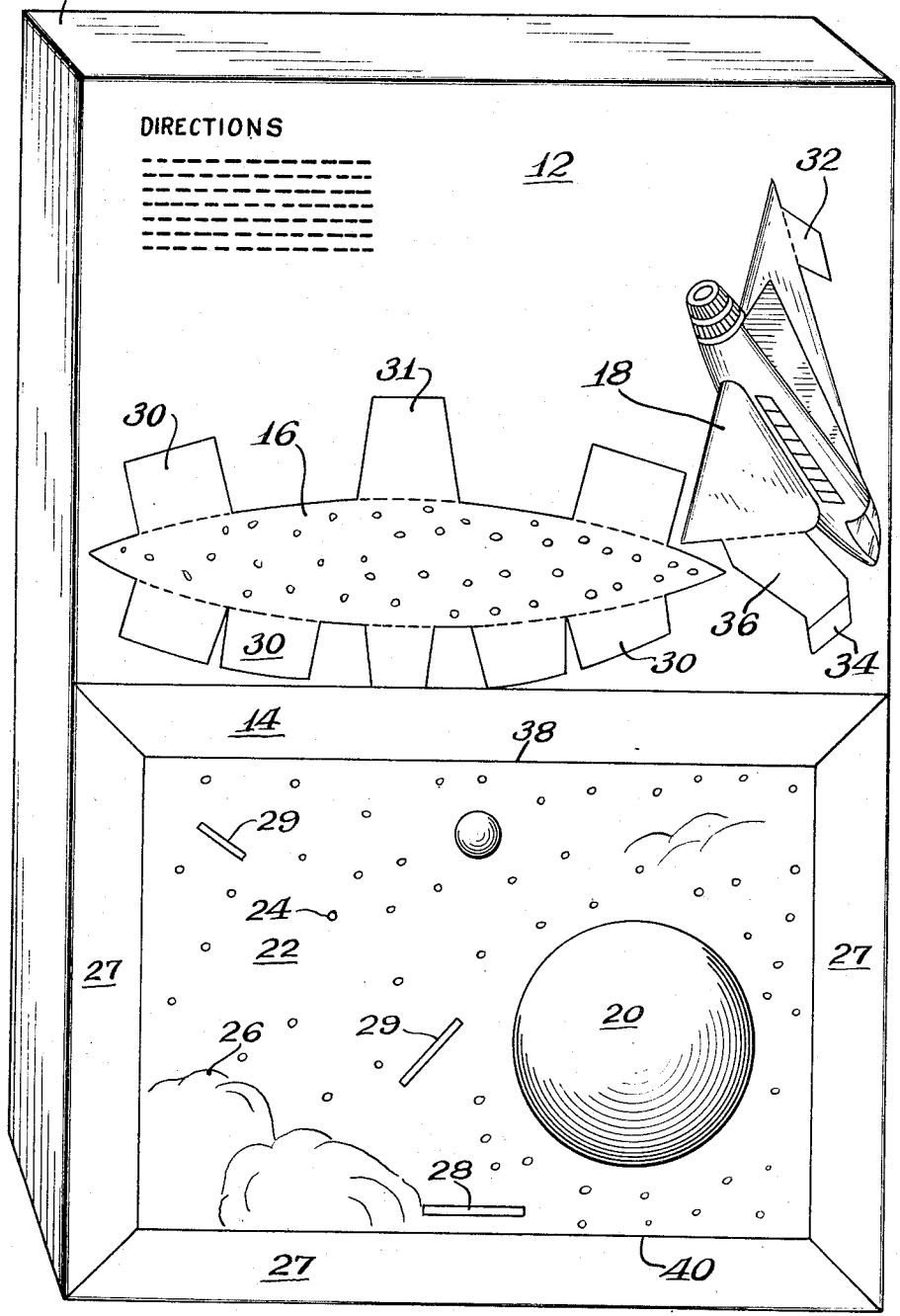
Fig. 1 is a perspective of a box such as a breakfast cereal carton showing the back thereof substantially in elevation on which is printed the components of a picture embodying my invention.

In Fig. 1 is shown a cereal box 10 having a back 12 on which are printed, in outline and preferably in color, the components of an illustrative three dimensional picture as contemplated in my invention. As illustrated, it consists of three pieces: a picture sheet 14, a stage sheet 16 and a figure piece 18. The scene which my picture illustrates is an imaginary scene of space travel which children today are finding so interesting. I have in mind a series of such pictures depicting the various stages in such a journey; the "space ship" resting on the earth, the departure of the ship from the earth, the approach of the ship to the moon, scenes depicting the ship in relation to various astronomical features, an approach to an other-world destination, the landing on that world, etc. My invention, however, may be equally well applied to somewhat more earth-bound aircraft, cowboy scenes, pioneer scenes, sea pictures and the like, and within these fields sequences of pictures may be readily conceived so as to provide a continuity to maintain the interest of children. The scene used for illustration is one representing the approach of a "space ship" to another world 20.

The picture sheet 14 has on it a picture 22 of interstellar space dotted with stars 24 and clouds of cosmic dust 26. I have found that the use of intense flat dark colors is highly effective for the picture 22 proper. The picture is surrounded by a margin or border 27 which is colored to simulate a frame. The picture sheet has marked thereon a lower slot 28 and figure slots 29, the purpose of which will appear later.

The stage piece 16 is generally lenticular in outline and has a plurality of tabs 30 projecting outward therefrom. It has printed on it a continuation from the bottom of the picture sheet 14.

The figure piece 18 is any shape depending on what it is desired that it portray and in the illustrated instance represents the space ship. The figure piece here shown has a first tab 32 connected directly thereto and a second tab 34 connected to it by means of an arm 36. Directions for the assembling of the picture may be placed on the box as illustrated.

In order to assemble the picture, the three component pieces are cut out of the box back. Thereafter the figure sheet is slit along the upper 38 and lower 40 horizontal edges of the picture itself to the vertical margins of the picture. The slots 28 and 29 are likewise opened. The tabs 30 of the stage piece are folded down at right angles to the stage piece with the picture side of the stage piece up. The stage piece is then inserted in the lower slit 40 so as to spread the margin and the picture apart, the lenticular shape of the stage piece bending outward the margin and inward the picture. The stage piece may be secured in position by gluing the front tabs 30 to the back side of the margin and by passing the back center tab 31 through the lower slot 28 in the picture, bending the tab downward and gluing it to the back side of the picture below the slot 28. The back tabs being thus held against the picture piece, they are supported in a perpendicular position and are so proportioned to constitute legs for the picture to hold it upright. Since the stage extends from the slit 40 to the lower slot 28, it will be seen that it has an appreciable pitch which facilitates the optical integration of the picture portion printed on the picture itself and that portion printed on the stage.

The space ship is then added to the picture, the tab 32 being affixed to one of the slots 29 and the arm 36 being bent at substantially right angles or an acute angle to the body of the ship and the tab 34 being affixed to the other slot 29. The illusion is most successful if the arm 36 can be somewhat concealed behind the body of the figure piece 18 and be colored in a dark flat color so as to make it as inconspicious as possible.

The end result of this assembly is a free standing three dimensional picture in which a frame (preferably light colored) stands out substantially in front of a recessed dark background with a floor to the picture connecting the background picture to the frame so as to create an illusion of depth, and a figure, the brightly colored aircraft, touching the background picture but extending obviously away therefrom in an entirely different plane and being ingeniously secured to the background picture so that the means of support is for all practical purposes invisible.

A point of primary significance in the practice of my invention lies in the parallel horizontal slits to separate the back picture from the border or frame and bowing the back picture inward and the frame outward so as to recess the picture substantially behind the frame. The continuous curvature of the frame further contributes to the illusion. It will be noted that the reverse curvature of the picture terminates on the sides where it joins the frame. It is relevant to consider here the application to the moving picture industry of this very principle in creating an illusion of depth and the great effectiveness of this technique as is evidenced by the enormous public interest shown in this motion picture development.

I have found that the complete lenticular stage piece is not necessary in order to maintain the curvatures of the border and the back piece. A segment of the piece can accomplish the same purpose. Also it is apparent that if a curve is introduced into either the picture 22 proper or the frame, the distance between the vertical edges of the picture will be reduced and necessarily result in a corresponding curvature in the other of these components. Figs. 5 through 8 illustrate my application of this first method of maintaining the proper curvature. Fig. 5 shows a picture sheet 46 having a back picture 48 and a border or frame 50 thereabout. The picture sheet has marked thereon lower slots 52 and a picture slot 54. Fig. 6 illustrates the insert 56 which, in this application, incorporates both the stage piece 58 and the figure piece 60, no division of the two being necessary in order to obtain the three dimensional effect. The picture sheet 46 and the insert 56 are prepared for assembly as described above except that an additional cut made along the line 62 so as to provide a partial separation between the stage piece 58 and the figure piece 60 in order that the stage piece may be horizontal and the figure piece upstanding. The tabs 64 are bent downward the back tabs then being inserted in the slots 54 and the front tabs bearing against the back side of the frame. The stage piece 58 so being inserted between the frame 50 and picture 48 maintains the desired curvature therebetween. The picture piece 60 consisting of an aircraft 66 superimposed on a cloud bank 68 is thus left standing upright in front of and substantially spaced from the picture 48 and it will likewise be noted that since the left hand end of the picture piece, i. e., that part which includes one wing and the tail portion of the aircraft, is free of attachment to any part of the picture, it therefore stands flat in a plane different from that of either the border 50 or the picture 48. The portions 70 and tabs 72 are employed to anchor further the insert to the picture, the portions 70 resting behind the frame 50 and the tab 72 being inserted in the figure slot 54. Attention is drawn to the fact that the cloud bank 68 successfully masks the absence of the right half of the stage piece 58.

Figs. 9 through 12 illustrate an embodiment of my invention which depends on the above mentioned principle of a curve in either the picture or the frame inducing a like curvature in the other. Fig. 9 again represents the picture sheet 74 with picture 76 and border 78. In this instance, however, only picture slots 80 are required. Fig. 10 illustrates the insert 82 which again defines the stage piece 84 and the picture piece 86. The picture sheet 74 is prepared again in the usual fashion, being cut out, slit along the horizontal edges of the picture and having the slots 80 opened. The insert is likewise cut out and the lower tabs 88 bent downward. An additional step however is provided in this application in that the insert is folded along the dotted line 90.

By virtue of the fold 90, a straight rigid edge is provided out from which the stage piece 84 projects. The deflection of the stage piece 84 is impossible because of the rigidity of this folded edge. Therefore, the outer edge 92 of the stage piece introduces a curvature into the border which, as was stated before, imposes a reverse curvature on the picture 76 proper. Thus the frame 18 and picture have their desired curvatures even though the insert employed represents only a longitudinal half of the stage piece of the form shown in Figs. 1 through 4. The figure piece is supported by the tab 94 at the end of an arm 96 and the side tab 98. The location of the side tab 98 within its appropriate slot 80 prevents the back edge of the stage piece from rising or in other words, prevents the insert from unfolding. The tab 96 should be folded back at an acute angle to the picture piece so as to be relatively inconspicuous, the tab 94 supporting the central part of the picture sheet in a proper vertical position. Since the insert of this modification extends entirely across the picture, it will be noted that the stage piece 84 is made continuous with the picture piece 86 so as to lend a three dimensional aspect to the figure piece alone in addition to the three dimensional aspect of the figure piece in relation to the back picture. Here again it will be noted that the absence of half of the stage piece is screened by the figure piece. Should tabs to constitute the back support of the picture be lacking, as in this case, a small portion of the box side may be outlined to be cut out and glued to the back of the picture to furnish such support.

From the above description, it will be seen that I have provided a cut out game or kit for the construction of three dimensional pictures, the assembly of which can be highly entertaining to children and that the pictures when completed have the components thereof arranged in a plurality of planes against a pictorial background of concave curvature recessed substantially behind a simulated frame, the over all effect of which presents a very effective three dimensional illusion in neatly edged free standing form.

I claim:

1. A three dimensional picture comprising a sheet having a background picture printed thereon and a border on said sheet around said picture, said sheet being slit along the top and bottom edges of said picture, means interposed between said picture and said border in one of said slits to curve the picture inwardly and the border outwardly and a second pictorial element positioned in front of said picture, at least a portion of said element being spaced away from said picture.

2. A three dimensional picture comprising a sheet having a background picture printed thereon and a border on said sheet around said picture, said sheet being slit along the top and bottom edges of said picture, and a second sheet having a portion inserted edgewise between said picture and said border in one of said slits to curve the picture inwardly and the border outwardly, said second sheet having another portion which constitutes a second pictorial element, said element standing upright in front of said picture and at least partially spaced therefrom.

3. A three dimensional picture comprising a sheet having a background picture printed thereon and a border on said sheet around said picture, said sheet being slit along the top and bottom edges of said picture and a second sheet folded to provide an upright pictorial element positioned in front of said picture in spaced relation therefrom and a substantially horizontal portion having a convex free edge, said portion being inserted in the lower of said slits between said picture and said border to curve said border outwardly and said picture inwardly.

4. A three dimensional picture comprising a first sheet having a back picture inside a margin, said sheet being slit along the horizontal picture boundaries, a stiff lenticular second sheet inserted in the lower of said slits, curving the picture inwardly and the margin outwardly, said second sheet having supporting legs depending therefrom to hold said picture upright and a third sheet having a figure printed thereon and at least one arm secured to said picture, said arm holding said figure in a different plane from that of the picture.

5. A three dimensional picture including a background which comprises a sheet having a background picture thereon and a border on said sheet around said picture, said sheet being slit along the top and bottom edges of the picture, and means interposed between said picture and said border in the lower of said slits to curve the picture inwardly and the border outwardly, and a second pictorial element secured to said background to be situated in front of said picture to stand outwardly therefrom.

6. A three dimensional picture comprising a single sheet, having portions of said picture reproduced on one side only of said sheet, a portion of said sheet comprising a background picture surrounded by a border having parallel inner lines along the upper and lower picture boundaries, said sheet being adapted to be slit along said lines to separate the background from the border along said lines and a second portion of said sheet adapted upon removal therefrom to be inserted between the background and the border to curve said background inwardly and said border outwardly.

7. A three dimensional picture comprising a single sheet, having portions of said picture reproduced on one side only of said sheet, a portion of said sheet comprising a background picture surrounded by a border having parallel inner lines along the upper and lower picture boundaries, said sheet being adapted to be slit along said lines to separate the background from the border along said lines and a second portion of said sheet adapted upon removal therefrom to be inserted between the background and the border to curve said background inwardly and said border outwardly, and means comprising a second pictorial element adapted upon removal from said sheet to be secured to said background projecting outwardly therefrom.

References Cited in the file of this patent

UNITED STATES PATENTS

| Number | Name | Date |
|---|---|---|
| 969,315 | Walcutt | Sept. 6, 1910 |
| 1,255,743 | Hart | Feb. 5, 1918 |
| 1,499,891 | Storer | July 1, 1924 |
| 1,523,284 | Powers | June 13, 1925 |
| 1,576,636 | Egan | Mar. 16, 1926 |
| 1,803,325 | Freedman | May 5, 1931 |
| 1,990,671 | Redington | Feb. 12, 1935 |
| 2,110,784 | Wolfson | Mar. 8, 1935 |
| 2,049,231 | Storch | July 28, 1936 |
| 2,120,519 | Friedman et al. | June 14, 1938 |
| 2,127,808 | Cloud | Aug. 23, 1938 |
| 2,205,262 | Hayes | June 18, 1940 |
| 2,314,721 | Lowenstein | Mar. 23, 1943 |
| 2,343,741 | Blechta | Mar. 7, 1944 |
| 2,414,559 | Rochlus | Jan. 21, 1947 |
| 2,428,772 | Aranoff | Oct. 14, 1947 |

FOREIGN PATENTS

| Number | Country | Date |
|---|---|---|
| 436,046 | Great Britain | Oct. 3, 1935 |
| 802,625 | France | June 13, 1936 |